Dec. 6, 1949 G. SWAHNBERG 2,490,172
BI-DIRECTIONAL OVERLOAD CLUTCH
Filed April 21, 1945
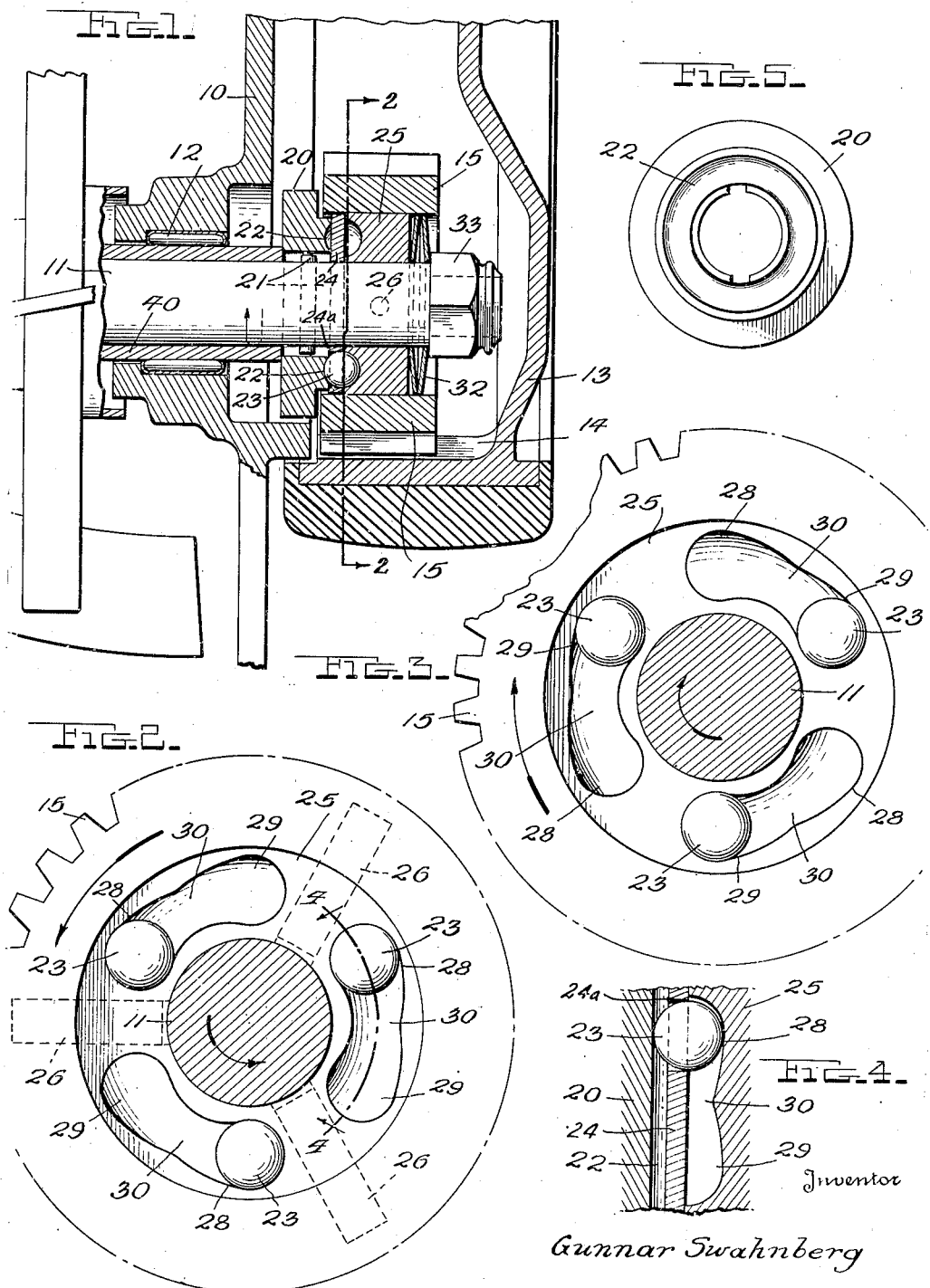
Inventor
Gunnar Swahnberg
By Mason, Porter & Diller
Attorneys Patented Dec. 6, 1949

2,490,172

UNITED STATES PATENT OFFICE 2,490,172

BIDIRECTIONAL OVERLOAD CLUTCH

Gunnar Swahnberg, Keene, N. H.

Application April 21, 1945, Serial No. 589,579

2 Claims. (Cl. 192—56)

This invention relates to clutches which are effective to transmit torque up to a predetermined maximum and then yield whereby to prevent damages to the structures.

A feature of the invention is a clutch mechanism of this type, in which the overload release is effective in either direction of drive.

Another feature is the provision of structural elements whereby the parts may be assembled for major operation in a selected direction without requiring care in selection and positioning of parts.

A further feature is the provision of a clutch mechanism which releases upon overload and thereafter permits continued forward motion of the driving element without essential drag thereon, and which can be easily and quickly reset after overload release.

With these and other features as objects in view, an illustrative embodiment of the invention is shown in the accompanying drawings, in which:

Figure 1 is a substantially horizontal section through parts of the rotating knife cage shaft and drive assembly of a lawn mower having the invention applied thereto.

Figure 2 is an upright section, substantially on line 2—2 of Fig. 1, showing the balls and driving cam piece in position for forward drive, and indicating the relative position of the pinion surrounding these parts.

Figure 3 is a view corresponding to Fig. 2, with the parts in position for forward release or retrograde drive.

Figure 4 is a small sectional view, substantially on the arcuate line 4—4 of Fig. 3.

Figure 5 is a face view of the shaft driving ring of this illustrative form.

In the illustrative form of these drawings, the clutch is shown as employed in a lawn mower having a frame 10 which carries the cage shaft 11 on the anti-friction bearings 12. This shaft is driven from the ground wheel 13 by engagement of the internal gear teeth 14 thereof with a pinion 15, and thence through the instant clutch. Other parts of the lawn mower may be conventional: the specific form is no part of this invention.

A ring 20 has opposed axial keyways (Fig. 5) on its inner periphery, and has a close sliding fit on the shaft 11 to permit easy assembly. This shaft has a cross pin 21 which fits the keyways so that the ring and shaft turn together but are permitted relative endwise sliding movements. The ring 20 has a circular groove 22 (Figs. 1 and 5) for receiving clutch elements illustrated as the three steel balls 23 each of which is located in a circular hole 24a of the ball separating and spacing disk 24, this disk being free for movement relative to the shaft 11, the ring 20, and the pinion 15.

The pinion 15 has a large central bore to receive a sliding cam piece 25 (Figs. 1 to 4) into the outer edge of which are tightly engaged the equispaced driving pins 26 which extend into apertures in the pinion, and which serve to compel the pinion 15 and the cam piece 25 to turn together.

The cam piece 25 has three equi-spaced arcuately arranged depressions, being one for each of the three balls 23. Each depression (Figs. 2-4) is deeper and wider at its ends 28, 29 than at its mid-length 30, and the floor therefore slopes toward the mid-length (Fig. 4) to form this shallow part of the respective depression. Thus, each depression is of dumb-bell shape.

A dished spring washer 32 acts between the cam piece 25 and an end nut 33 on the shaft 11. Movement of the shaft assembly toward the left in Fig. 1 is illustrated as prevented by a spacer collar 40 which normally rotates with the shaft 11 and is fixed against axial movement thereto, to restrict the general axial movement of the shaft 11 toward the right, and in the description of operation it will be assumed that only negligible movement of this shaft toward the right can occur.

In operation, as the source of power operates, the cam piece 25 is driven, which in the illustrated example is accomplished by the rotation of the ground wheel 13 as the lawn mower travels forwardly, or upwardly in Fig. 1, wherewith the teeth 14 cause the pinion 15 to turn counter-clockwise in Fig. 2, and therewith drive the cam piece 25. The balls 23 are in the ends 28 of their respective depressions in this cam piece and in the circular groove 22 of the ring 20. A load upon the shaft 11, by the cutting of grass or even by the engagement of the knives, causes the balls 23 to act as wedge pieces between the floors of the depressions and the ring 20, so that the latter is driven and the cage shaft 11 turns. If a greater normal load occurs, the ring 20 is retarded by this load and the continued forward motion of the cam piece 25 causes the balls to move toward the central part 30 of the respective depressions. This causes an axial separating pressure to be exerted between the ring 20 and the cam piece 25 and the latter moves away against the action of the spring 32 and slides on shaft 11. The resistance of this spring against this wedging effect of the balls causes a new equilibrium to be established in which the balls still occupy positions short of the central parts 30 of the depressions. By selection of the slope of the floors of the depressions—which preferably are curved to have an increasing slope as the center is approached—and of the pressure of the spring 32, the torque may be transmitted at any load range up to a predetermined maximum, and hence normal cutting of the lawn grass can be effected.

When the mower is pulled backward, the balls 23 pass to the deepest parts 28 of their respective depressions, the cam piece 25 slides on the shaft 11 under the pressure force which has been stored in the spring 32, and the cage remains stationary as in the conventional lawn mower.

However, if an obstacle such as a stump, stone, tree branch, etc., is encountered by the knives during forward mowing movement, the load upon the shaft 11 increases beyond this predetermined maximum, and no position of equilibrium is automatically formed by the system, and the balls travel past the central parts 30 of the depressions and go to the opposite ends 29 thereof, in which they no longer can serve as wedges to transmit an effective torque against such a load, and the cam piece 25 continues to turn without transmitting its effect to the ring 20; so that the knives are quickly relieved from driving pressure under the overload, and are saved from extensive damage. Under this condition of the parts, the lawn mower is no longer effective for cutting. It can be quickly and easily reset, however, by holding the shaft 11 against rotation, as by blocking the rotating knife cage against reversed rotation, and turning the ground wheel 13 backward. The reverse overloading condition is thus established, and the cam piece 25 turns while ring 20 is blocked, so that the balls are caused to travel relatively back along their respective depressions from the ends 29 to the central parts 30 and then to the ends 28. The clutch is now ready to drive the knives for cutting again.

The clutch thus can perform as an overload-release clutch during the forward motion and as an over-running and non-driving clutch during retrograde motion; and can be simply and immediately reset in the event of operation of the overload release feature. The structure is also capable of performing as an overload-release clutch during retrograde drive with permissive over-running when moved in the forward direction. The value of this possibility may be illustrated under the conditions of employment of the clutch in a lawn mower as set out above.

It is desirable from time to time to grind the knives by employing an abrasive paste; and it is preferred to do this by a retrograde motion of the knife cage. In the past, this has been accomplished by using a crank, for directly engaging and driving the shaft 11, usually after removing the ground wheel. In the present device, the same retrograde motion can be obtained by blocking the knife cage by an obstacle and causing the balls to travel from the ends 28 to the ends 29 as described above. Thus, the abrasive paste can then be applied to the knives, and thereafter, by retrograde rotation of the ground wheel (as by backward trundling of the mower along the ground), the cage turns and the grinding is accomplished. At the conclusion of the grinding, the parts can be cleaned and reset for controlled forward cutting motion as set out above.

While the device has been illustrated with a lawn mower driven from one end only, it is obvious that it can be employed in many ways where an overload-release or idle-reverse motion is desired. The parts are symmetrical and hence the number of parts to be manufactured or kept in stock for repairs is reduced; and the repairman need not take care to properly insert "rights" and "lefts."

What is claimed is:

1. An overload clutch comprising coaxial driving and driven members, said members having a permitted axial movement toward and from one another, means for urging the members together, one said member having an arcuately arranged groove with its floor sloping from each end toward a shallow point between the ends, the other said member presenting a wall surface substantially in a radial plane opposite said groove, and a torque transmitting device movable along said arcuate groove and engaged with the said wall surface for transmitting stresses axially between said members, the clutch acting upon overload to cause the device to travel along the arcuate groove past the shallow point and therewith causing axial separation of the said members against the action of said urging means, and to cause the said device to pass to the opposite end of said arcuate groove whereby to relieve the device from torque transmission upon excess loading of said driven member.

2. An overload clutch comprising coaxial driving and driven members, said members having a permitted axial movement toward and from one another; a spring for urging the members together, one member having a circular groove in its end and the other member having at least one arcuate groove opposed to said circular groove, said arcuate groove being deeper at its ends than at the center of its length and having its floor sloping toward the center and being symmetrical about the radial plane through said center of length, and a ball engaged in said grooves whereby the ball acts between said floor and the wall of the circular groove to transmit driving torque and to approach the center of length of the arcuate groove in proportion as the load increases up to the maximum and therewith forcing the members apart against the action of the spring, and whereby said ball passes beyond said center and enters the other end of the arcuate groove when said maximum is exceeded.

GUNNAR SWAHNBERG.

REFERENCES CITED

The following references are of record in the file of this patent:

UNITED STATES PATENTS

| Number | Name | Date |
|---|---|---|
| 2,045,086 | Kastner | June 23, 1936 |
| 2,182,627 | Gauld | Dec. 5, 1939 |
| 2,257,759 | Niemann | Oct. 7, 1941 |